(12) United States Patent
Szor

(10) Patent No.: US 7,380,277 B2
(45) Date of Patent: May 27, 2008

(54) PREVENTING E-MAIL PROPAGATION OF MALICIOUS COMPUTER CODE

(75) Inventor: Peter Szor, Santa Monica, CA (US)

(73) Assignee: Symantec Corporation, Cupertino, CA (US)

(*) Notice: Subject to any disclaimer, the term of this patent is extended or adjusted under 35 U.S.C. 154(b) by 886 days.

(21) Appl. No.: 10/255,658

(22) Filed: Sep. 25, 2002

(65) Prior Publication Data
US 2004/0015726 A1 Jan. 22, 2004

Related U.S. Application Data

(60) Provisional application No. 60/397,922, filed on Jul. 22, 2002.

(51) Int. Cl.
*G06F 11/00* (2006.01)
*G06F 11/30* (2006.01)

(52) U.S. Cl. ......................... 726/24; 713/188
(58) Field of Classification Search ................ 713/188; 726/22
See application file for complete search history.

(56) References Cited

U.S. PATENT DOCUMENTS

| | | | |
|---|---|---|---|
| 5,440,723 A | 8/1995 | Arnold et al. | |
| 5,452,442 A | 9/1995 | Kephart | |
| 5,473,769 A | 12/1995 | Cozza | |
| 5,572,590 A | 11/1996 | Chess | |
| 5,696,822 A * | 12/1997 | Nachenberg | 726/24 |
| 5,715,174 A | 2/1998 | Cotichini et al. | |
| 5,715,464 A | 2/1998 | Crump et al. | |
| 5,758,359 A | 5/1998 | Saxon | |
| 5,812,763 A | 9/1998 | Teng | |
| 5,889,943 A * | 3/1999 | Ji et al. | 726/22 |
| 5,951,698 A | 9/1999 | Chen et al. | |
| 5,956,481 A * | 9/1999 | Walsh et al. | 726/23 |

(Continued)

FOREIGN PATENT DOCUMENTS

DE   100 21 686 A1   11/2001

(Continued)

OTHER PUBLICATIONS

Szor, P. and Ferrie, P., Attacks on Win32, Virus Bulletin Conference, Sep. 1998, Virus Bulletin Ltd., The Pentagon, Abingdon, Oxfordshire, England, pp. 57-84.

(Continued)

*Primary Examiner*—Emmanuel L Moise
*Assistant Examiner*—Ali S Abyaneh
(74) *Attorney, Agent, or Firm*—Fenwick & West LLP

(57) ABSTRACT

Computer-implemented methods, systems, and computer-readable media for detecting the presence of malicious computer code in an e-mail sent from a client computer (1) to an e-mail server (2). An embodiment of the inventive method comprises the steps of: interposing (41) an e-mail proxy server (31) between the client computer (1) and the e-mail server (2); allowing (42) the proxy server (31) to intercept e-mails sent from the client computer (1) to the e-mail server (2); enabling (43) the proxy server (31) to determine when a file (30) is attempting to send itself (30) as part of an e-mail; and declaring (44) a suspicion of malicious computer code when the proxy server (31) determines that a file (30) is attempting to send itself (30) as part of an e-mail.

18 Claims, 4 Drawing Sheets

U.S. PATENT DOCUMENTS

| | | | |
|---|---|---|---|
| 5,960,170 A * | 9/1999 | Chen et al. | 714/38 |
| 5,978,917 A | 11/1999 | Chi | |
| 5,987,610 A | 11/1999 | Franczek et al. | |
| 6,052,709 A | 4/2000 | Paul et al. | |
| 6,070,244 A | 5/2000 | Orchier et al. | |
| 6,072,830 A | 6/2000 | Proctor et al. | |
| 6,088,803 A | 7/2000 | Tso et al. | |
| 6,094,731 A | 7/2000 | Waldin et al. | |
| 6,104,872 A | 8/2000 | Kubota et al. | |
| 6,108,799 A | 8/2000 | Boulay et al. | |
| 6,167,434 A | 12/2000 | Pang | |
| 6,192,379 B1 | 2/2001 | Bekenn | |
| 6,199,181 B1 | 3/2001 | Rechef et al. | |
| 6,275,938 B1 | 8/2001 | Bond et al. | |
| 6,338,141 B1 | 1/2002 | Wells | |
| 6,357,008 B1 | 3/2002 | Nachenberg | |
| 6,370,648 B1 | 4/2002 | Diep | |
| 6,493,007 B1 | 12/2002 | Pang | |
| 6,535,891 B1 | 3/2003 | Fisher et al. | |
| 6,552,814 B2 | 4/2003 | Okimoto et al. | |
| 6,611,925 B1 | 8/2003 | Spear | |
| 6,622,150 B1 * | 9/2003 | Kouznetsov et al. | 707/200 |
| 6,678,734 B1 | 1/2004 | Haatainen et al. | |
| 6,697,950 B1 | 2/2004 | Ko | |
| 6,721,721 B1 | 4/2004 | Bates et al. | |
| 6,748,534 B1 | 6/2004 | Gryaznov et al. | |
| 6,763,462 B1 | 7/2004 | Marsh | |
| 6,813,712 B1 | 11/2004 | Luke | |
| 6,851,057 B1 | 2/2005 | Nachenberg | |
| 6,910,134 B1 | 6/2005 | Maher et al. | |
| 2002/0004908 A1 | 1/2002 | Galea | |
| 2002/0035696 A1 | 3/2002 | Thacker | |
| 2002/0046275 A1 | 4/2002 | Crosbie et al. | |
| 2002/0083175 A1 | 6/2002 | Afek et al. | |
| 2002/0091940 A1 | 7/2002 | Wellborn et al. | |
| 2002/0157008 A1 | 10/2002 | Radatti | |
| 2002/0162015 A1 | 10/2002 | Tang | |
| 2002/0178374 A1 | 11/2002 | Swimmer et al. | |
| 2003/0023865 A1 | 1/2003 | Cowie et al. | |
| 2003/0051026 A1 | 3/2003 | Carter et al. | |
| 2003/0065926 A1 | 4/2003 | Schultz et al. | |
| 2003/0115485 A1 | 6/2003 | Milliken | |
| 2003/0120951 A1 | 6/2003 | Gartside et al. | |
| 2003/0126449 A1 | 7/2003 | Kelly et al. | |
| 2003/0140049 A1 | 7/2003 | Radatti | |
| 2003/0191966 A1 | 10/2003 | Gleichauf | |
| 2003/0212902 A1 | 11/2003 | van der Made | |
| 2003/0236995 A1 | 12/2003 | Fretwell, Jr. | |
| 2004/0015712 A1 | 1/2004 | Szor | |
| 2004/0015726 A1 | 1/2004 | Szor | |
| 2004/0030913 A1 | 2/2004 | Liang et al. | |
| 2004/0158730 A1 | 8/2004 | Sarkar | |
| 2004/0162808 A1 | 8/2004 | Margolus et al. | |
| 2004/0181687 A1 | 9/2004 | Nachenberg et al. | |
| 2005/0021740 A1 | 1/2005 | Bar et al. | |
| 2005/0044406 A1 | 2/2005 | Stute | |
| 2005/0132205 A1 | 6/2005 | Palliyil et al. | |
| 2005/0177736 A1 | 8/2005 | De los Santos et al. | |
| 2005/0204150 A1 | 9/2005 | Peikari | |
| 2006/0064755 A1 | 3/2006 | Azadet et al. | |

FOREIGN PATENT DOCUMENTS

| | | |
|---|---|---|
| EP | 1 280 039 A | 1/2003 |
| GB | 2 364 142 A | 1/2002 |
| WO | WO 97/39399 A | 10/1997 |
| WO | WO 01/91403 A | 11/2001 |
| WO | WO 02/05072 A | 1/2002 |

OTHER PUBLICATIONS

Szor, P. and Ferrie, P., "Attacks in Win32 Part II", Virus Bulletin Conference, Sep. 2000, Virus Bulletin Ltd., The Pentagon, Abington, Oxfordshire, England, pp. 47-68.

Delio, M., "Virus Throttle a Hopeful Defense", Wired News, Dec. 9, 2002, retrieved from Internet Http://www.wired.com/news/print/0,1294,56753,00.html Jan. 7, 2003.

"System File Protection and Windows ME", [online], last updated Dec. 4, 2001, [retrieved on Apr. 9, 2002] Retrieved from the Internet: <URL: http://www.Microsoft.com/hwdev/archive/sfp/winME$_{13}$sfpP.asp>.

"Description of Windows 2000 Windows File Protection Feature (Q222193)", [online], first published May 26, 1999, last modified Jan. 12, 2002, [retrieved on Apr. 9, 2002] Retrieved from the Internet <URL: http://support.microsoft.com/default.aspx?scid=kg:EN-US;q222193>.

"Software: Windows ME; Windows ME and System File Protection", [online] last updated Mar. 11, 2002, [retrieved on Apr. 9, 2002] Retrieved from the Internet: <URL: http//www.wackyb.co.nz/mesfp.html>.

Szor, P., "Memory Scanning Under Windows NT", Virus Bulletin Conference, Sep. 1999, Virus Bulletin Ltd., The Pentagon, Abingdon, Oxfordshire, England, pp. 1-22.

Parkhouse, Jayne, "Pelicon SafeTNet 2.0" [online], Jun. 2000, SC Magazine Product Review, [retrieved on Dec. 1, 2003]. Retrieved from the Internet: <URL; http://www.scmagazine.com/scmagazine/standalone/pelican/sc_pelican.html.

Szor, P. and Ferrie, P., "Hunting for Metamorphic", Virus Bulletin Conference, Sep. 2001, Virus Bulletin Ltd., The Pentagon, Abingdon, Oxfordshire, England, pp. 123-144.

"News Release—Symantec Delivers Cutting-Edge Anti-Virus Technology with Striker32", Oct. 1, 1999, 2 pages, [online]. Retrieved on Nov. 11, 2003. Retrieved from the Internet:<URL:http://www.symantec.com/press/1999/n991001. html>. Author unknown. (Cupertino, California).

Toth, et al "Connection-history based anomaly detection" Proceedings of the 2002 IEEE Workshop on Information Assurance and Security. West Point, NY, Jun. 17-19, 2002. pp. 30-35.

Kephart, Jeffrey et al., "An Immune System For Cyberspace" IBM Thomas J. Watson Research Center, IEEE 1997, pp. 879-884.

Symantec Corporation, "Norton AntiVirus Corporate Edition", 1999, Version 1, pp. 15,22.

Bakos et al., "Early Detection of Internet Warm Activity by Metering ICMP Destination Unreachable Activity.", Proc. Of SPIE Conference on Sensors, and Command, Control, Communications and Intelligence, Orlando, Apr. 2002.

* cited by examiner

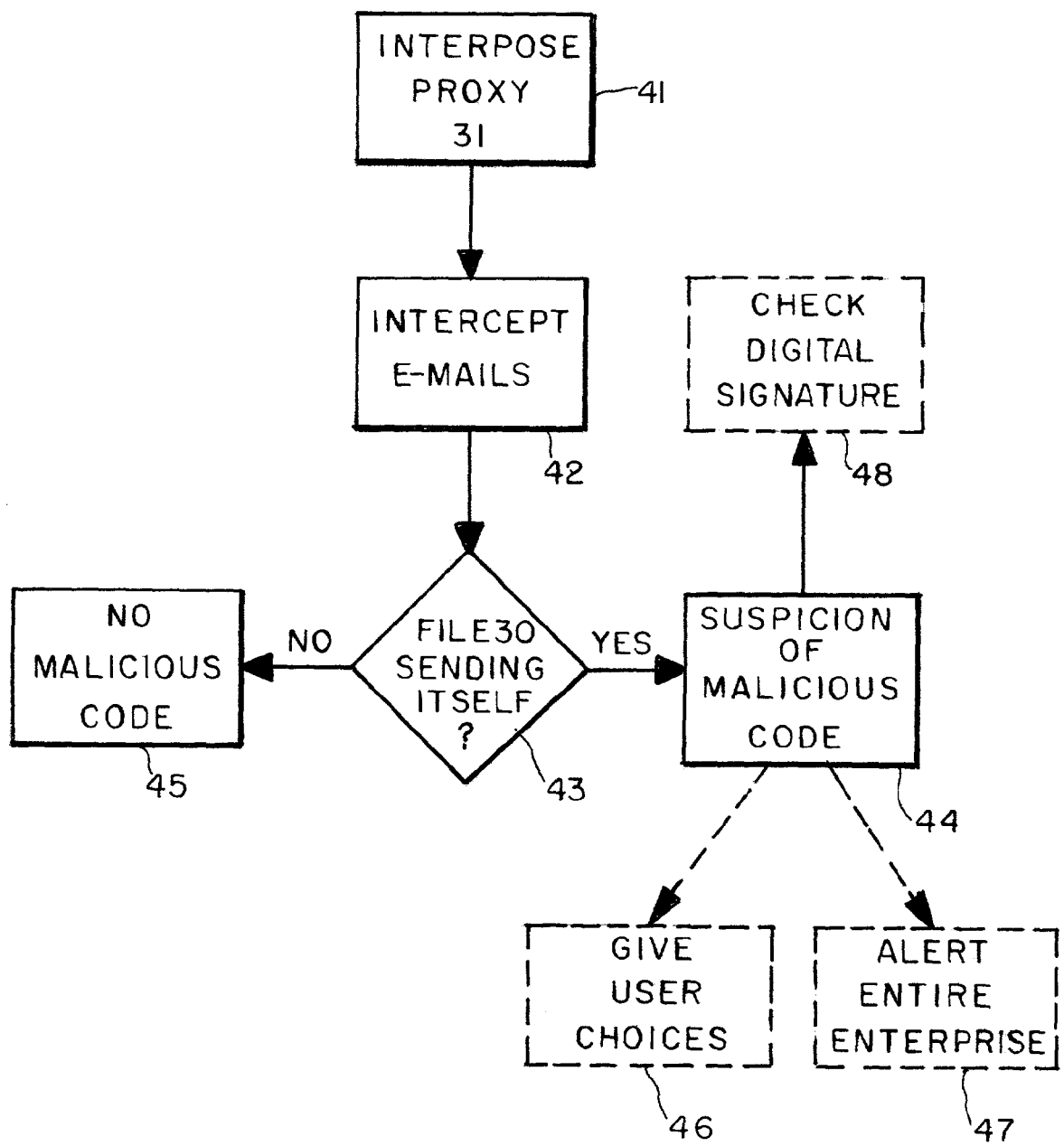

US 7,380,277 B2

PREVENTING E-MAIL PROPAGATION OF MALICIOUS COMPUTER CODE

RELATED APPLICATION

This patent application claims priority upon commonly owned U.S. provisional patent application Ser. No. 60/397,922 filed Jul. 22, 2002 entitled "Proactive Prevention of SMTP Mass Mailing Worms", which provisional patent application is hereby incorporated by reference in its entirety into the present patent application.

TECHNICAL FIELD

This invention pertains to the field of preventing malicious attacks to computers, and, in particular, preventing e-mail propagation of malicious computer code.

BACKGROUND ART

As used herein, "malicious computer code" is any code that enters a computer without an authorized user's knowledge and/or without an authorized user's consent. Malicious computer code that propagates from one computer to another over a network, e.g., via e-mail, is often referred to as a "worm". Most worms that spread from one computer to another are spread via e-mail over the Internet. The most common way to send e-mail over the Internet is using the SMTP (Simple Mail Transfer Protocol). SMTP is part of TCP/IP (Transfer Control Protocol/Internet Protocol). SMTP was originally designed to send only that e-mail that consists solely of text and that is encoded using the ASCII character set, which is limited. It soon became apparent that computer users wished to send other than straight ASCII characters as e-mail, and so encoding schemes such as UUencode and MIME were developed. These encoding schemes are capable of encoding any type of file, including a binary graphics file, into ASCII so that it can be sent as an e-mail attachment.

FIG. 1 illustrates a common system by which a client computer 1 can send e-mail to a recipient computer 5 over an open network 4 such as the Internet. In FIG. 1, it is assumed that there are a plurality N of client computers 1 located within an enterprise 3. Enterprise 3 may be a company, a university, a government agency, etc. Computers 1 are coupled to each other and to an e-mail server computer 2 over a Local Area Network (LAN) 6. E-mail server 2 collects and formats e-mails sent from computers 1 and sends them to the designated recipients 5 using the SMTP protocol. It is assumed that there are a plurality J of recipient computers.

FIG. 2 illustrates a similar network in which client computers 1 are not associated with the same enterprise 3, but rather may be more geographically dispersed and are subscribers to an Internet Service Provider (ISP). In this case, computers 1 communicate with the ISP's e-mail server 2 via the Public Switched Telephone Network (PSTN) 6. In other respects, the functioning of the networks illustrated in FIGS. 1 and 2 are the same.

DISCLOSURE OF INVENTION

Computer-implemented methods, systems, and computer-readable media for detecting the presence of malicious computer code in an e-mail sent from a client computer (1) to an e-mail server (2). An embodiment of the inventive method comprises the steps of: interposing (41) an e-mail proxy server (31) between the client computer (1) and the e-mail server (2); allowing (42) the proxy server (31) to intercept e-mails sent from the client computer (1) to the e-mail server (2); enabling (43) the proxy server (31) to determine when a file (30) is attempting to send itself (30) as part of an e-mail; and declaring (44) a suspicion of malicious computer code when the proxy server (31) determines that a file (30) is attempting to send itself (30) as part of an e-mail.

BRIEF DESCRIPTION OF THE DRAWINGS

These and other more detailed and specific objects and features of the present invention are more fully disclosed in the following specification, reference being had to the accompanying drawings, in which:

FIG. 4 is a flow diagram illustrating an embodiment of the present invention.

DETAILED DESCRIPTION OF THE PREFERRED EMBODIMENTS

Nefarious persons sending malicious computer code via e-mails have resorted to many tricks to spread their malicious messages. A typical e-mail may look something like this:

IP x.y.z.1:25 (SMTP)
HELLO someone
RCPT to: edGXYZ.com
FROM: XYZGx17as.com
SUBJECT: HELLO
DATA
MIME-encoded attachments One of the tricks employed by authors of malicious code is to falsify the "FROM" field so that the recipient of the e-mail will be lulled into thinking that the e-mail was sent from a known, reputable source.

Sometimes the malicious code will be encrypted, making it difficult for a conventional anti-virus scanner to analyze it.

Modern worms such as Klez self-activate simply by the user clicking open the e-mail message itself: the user doesn't even have to click on the e-mail attachment containing the worm. Klez has operated through the popular e-mail software known as Microsoft Outlook. Klez contains its own SMTP client embedded in the worm; it does not rely on Outlook.

The present invention thwarts the propagation of malicious computer code being sent in an email from a client computer 1 to an e-mail server 2, by means of interposing (step 41 of FIG. 4) an e-mail proxy server 31 (hereinafter referred to as "proxy") between the client computer 1 and the e-mail server 2. The client computer 1 thinks that the proxy 31 is the real e-mail server 2. The proxy 31 may be associated with the client computer 1, e.g., it may reside within computer 1.

Figure 1:
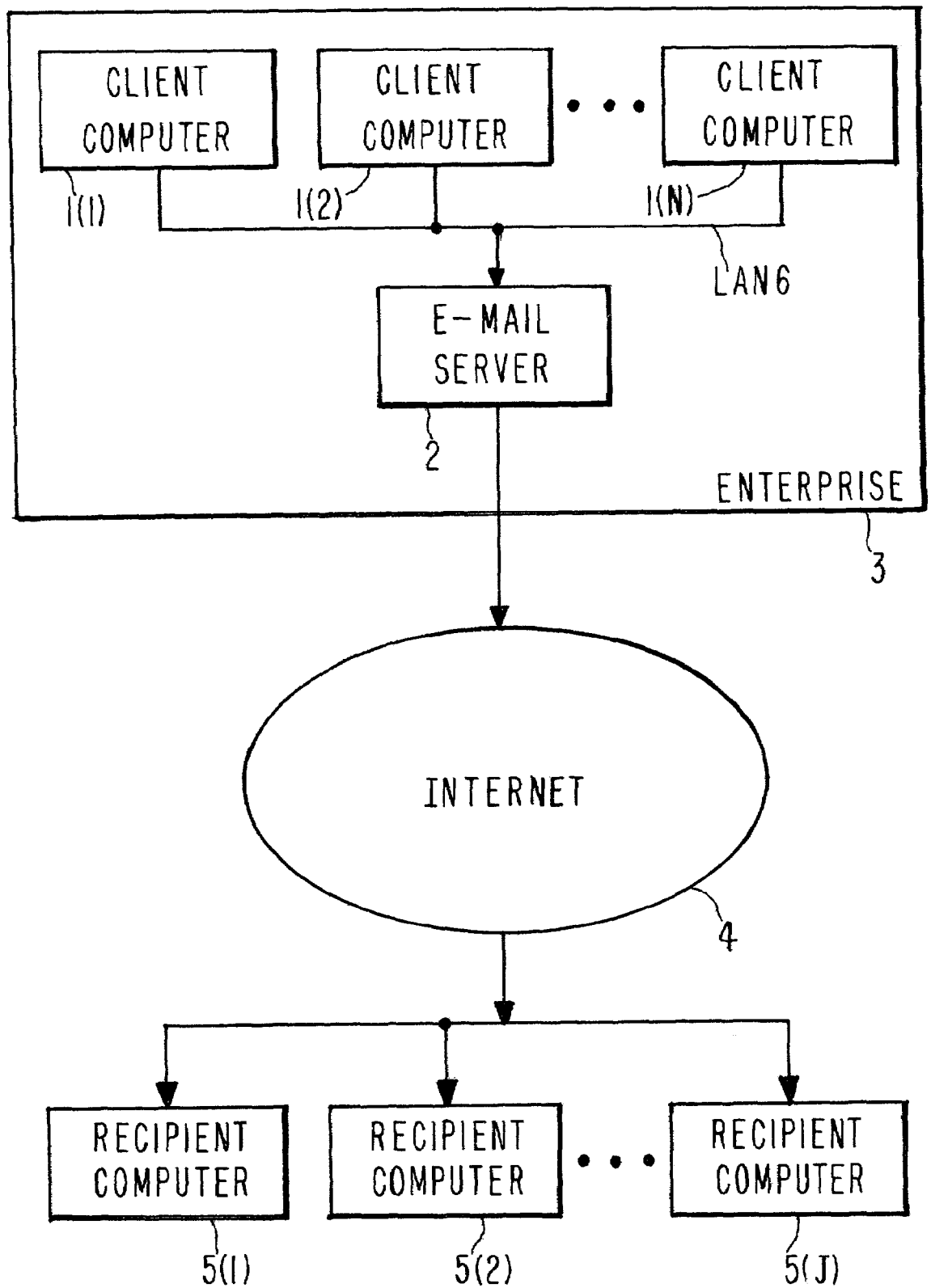
FIG. 1 is a system level diagram of a conventional network for sending e-mail from within an enterprise 3.
Figure 2:
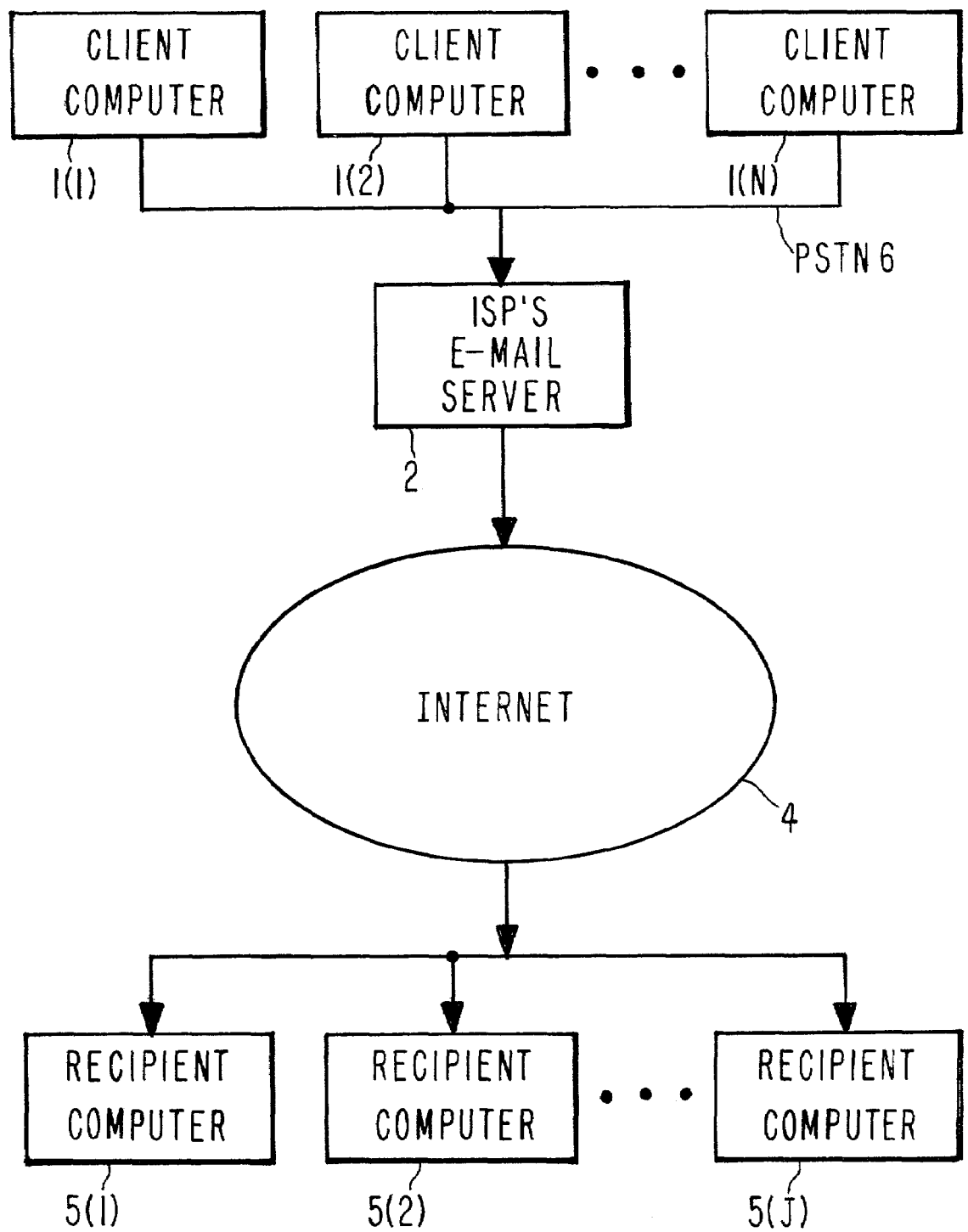
FIG. 2 is a system level diagram of a conventional network for sending e-mail via an Internet Service Provider (ISP) computer 2.
Figure 3:
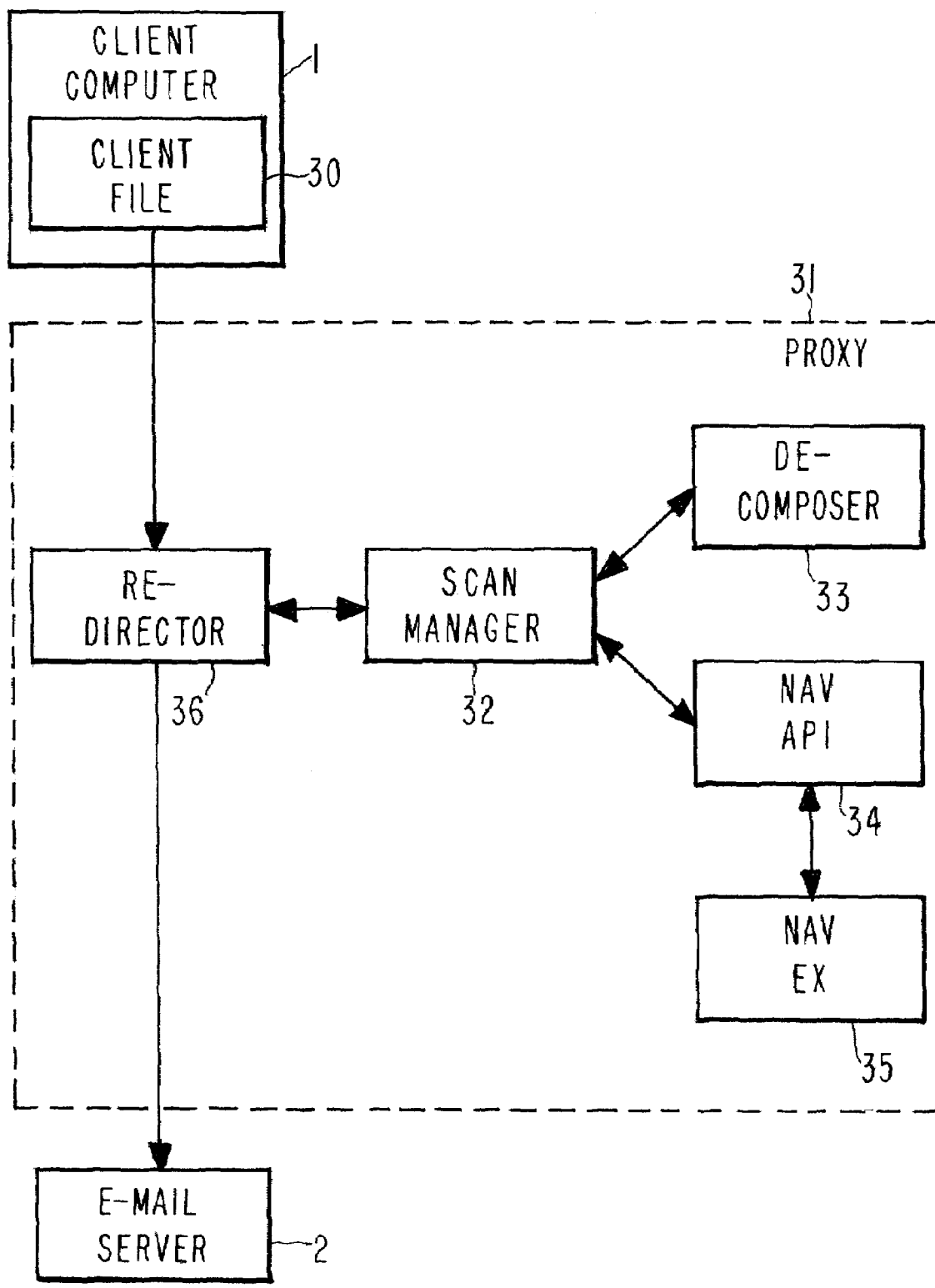
FIG. 3 is a block diagram illustrating an embodiment of the present invention.

FIG. 3 illustrates the basic architecture of proxy 31. Redirector 36 intercepts e-mail messages, and tricks client file 30 into thinking that redirector 36 is e-mail server 2. Scan manager 32 is coupled to re-director 36, and contains intelligence for examining the contents of e-mails. Decomposer 33 is coupled to scan manager 32; and unpacks (e.g., unzips) objects and sends the decomposed objects back to scan manager 32 one by one. Decomposer 33 is invoked when the e-mail being analyzed by scan manager 32 contains many objects, e.g., an e-mail body and several e-mail attachments that are zipped or otherwise combined. In that case, decomposer 33 unzips the objects and presents them to scan manager 32 one by one for further analysis. API 34 such as Norton Antivirus Application Programming Interface (NAVAPI) 34 is coupled to scan manager 32, and presents scan manager 32 with ready access to conventional antivirus software. Extensions 35 such as Norton Antivirus Extensions (NAVEX) 35 are coupled to NAVAPI 34 and contain all of the scanning engines, virus signatures, and virus names used in conventional antivirus scanning. Modules 31-36 may be implemented in hardware, software, and/or firmware, or any combination thereof.

In the embodiment where e-mail server 2 adheres to the SMTP protocol, proxy 31 adheres to the SMTP protocol as well. Generally speaking, proxy 31 adheres to the same protocol adhered to by e-mail server 2.

At step 42 of FIG. 4, proxy 31 is enabled to intercept e-mail sent from the client computer 1 to the e-mail server 2. The enabling may be accomplished by the user of computer 1 clicking on a "e-mail scanning" feature on antivirus software (such as Norton Antivirus manufactured by Symantec Corporation of Cupertino, Calif.) that has been installed on the user's computer 1. Such an enabling may, for example, serve to activate proxy 31 every time a client file 30 within client computer 1 attempts to access the computer's port 25, which is the conventional port used in personal computers for sending e-mail over the Internet.

At step 43, scan manager 32 determines whether file 30 is attempting to send itself, either as part of the e-mail body or as an e-mail attachment. The determination that is made in step 43 can vary based upon the type of file 30. The name of the file 30 is ascertained by redirector 36 and given to scan manager 32. In the WIN32 API of Microsoft Corporation, scan manager 32 determines whether file 30 is a file in the PE (portable executable) format. The PE header identifies file 30 as a PE file. Section headers determine the type of the section, e.g., code sections, data sections, resource sections, etc. For a PE file in the WIN 32 API, scan manager 32 examines the entire code section or code sections. Scan manager 32 performs a compare between two versions of file 30: the version that has been intercepted and that now resides within proxy 31 versus the version that resides in client computer 1. In one embodiment, scan manager 32 declares a suspicion of malicious code in step 44 when the two versions are nearly identical. If the two versions are not nearly identical, scan manager 32 declares in step 45 that no malicious code is present in file 30. "Nearly identical" is defined throughout this patent application to mean that no more than one byte out of a preselected threshold number of bytes varies between the two versions. In one embodiment, the preselected threshold number of bytes is 512. Other preselected threshold numbers can be selected based on the application. The reason for not insisting upon perfect matching between the two versions of the file is that the malicious code occasionally modifies a byte of the file.

Once a suspicion of malicious code is declared in step 44, one or more optional steps 46, 47, and 48 can be invoked. Steps 46 and 48 serve to reduce the number of unwanted false positives (declaring a file 30 to be contaminated when it isn't).

In optional step 46, the user of computer 1 is given a set of choices when a suspicion of malicious code has been declared in step 44. These choices may be presented to the user via a dialog box which pops up on the user's monitor. Such a dialog box may look like the following:

Malicious Worm Alert

Filename: readme.exe

Norton AntiVirus has detected a malicious worm on your computer that is trying to e-mail itself to other computers. If this Malicious Worm Alert appeared when you were not sending an e-mail message, the worm is trying to spread itself by e-mail, and you should select the "Quarantine this worm (Recommended)" option from the following drop down list. You can get more information about the worm from the Symantec Security Response virus encyclopedia.

Select one of the following actions:

Stop this worm from e-mailing itself. This stops the worm from e-mailing itself at this time, but does not quarantine the worm. This action leaves the worm on your computer, where it can possibly be activated again. Select this option only if you are sure you want to leave the worm on your computer.

Quarantine this worm (Recommended). This permanently stops the worm by putting it in the Norton AntiVirus Quarantine. While in Quarantine, the worm will not be able to spread itself. This is the safest action.

Allow this application to send e-mail attachments. This sends the e-mail containing a potential worm. Such a worm could infect the recipient's computer. Select this option only if you are sure the e-mail is not infected with a worm.

Always allow this application to send e-mail attachments. In the future, Norton AntiVirus will not check this file for worms. This is the riskiest action, because such a worm could e-mail itself from your computer without your knowledge.

Note that the file name of the suspicious file 30 is given to the user, along with four choices. If the second choice is selected (quarantining the worm), file 30 is encrypted and sent to the headquarters of the antivirus company (in this case, Symantec) for analysis.

It is expected that the user would rarely select choices three or four (allowing the application to send e-mail attachments). Such a choice might be selected when the user is attempting to e-mail the entire e-mail software program to a recipient 5.

In optional step 47, an alert is sent to every client computer 1 associated with the enterprise 3. The alert serves to warn other users of possible problems.

In optional step 48, scan manager 32 checks to see whether a digital signature has been affixed to file 30, and, if so, verifies the digital signature with a trusted source in a conventional manner. If the digital signature is present and is verified by the trusted third party, scan manager 32 then rescinds the declaration of suspected malicious code found in step 44, and deems the file 30 to be clean after all.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for detecting by an e-mail proxy interposed between a client computer and an e-mail server the presence of malicious computer code in an e-mail sent from the client computer to the e-mail server, said method comprising the steps of:
- intercepting by the e-mail proxy that is interposed between the client computer and the e-mail server e-mails sent from the client computer to the e-mail server, wherein the proxy intercepts an e-mail sent with a file by an application on the client computer;
- comparing the file that was intercepted by and now resides within the proxy with the application that sent the e-mail and that resides on the client computer to determine whether the application is attempting to send itself as part of the e-mail;
- declaring a suspicion of malicious code in the file and in the application when the file is determined to be a nearly identical copy of the application;
- determining whether a digital signature has been affixed to the file;
- verifying the digital signature with a trusted source upon determining that a digital signature has been affixed to the file; and
- rescinding the declaration of a suspicion of malicious code responsive to the determination and positive verification.

2. The method of claim 1 wherein the proxy resides within the client computer.

3. The method of claim 1 wherein the e-mail server and the proxy adhere to the SMTP protocol.

4. The method of claim 1 further comprising, in response to the declaring step, the step of sending a message to a user of the client computer.

5. The method of claim 4 wherein the message gives the user a plurality of choices, comprising at least one choice from the following group of choices:
- preventing the application from e-mailing itself;
- quarantining the application;
- allowing the application to send e-mail attachments; and
- always allowing the application to send e-mail attachments.

6. The method of claim 5 further comprising, when the user chooses to quarantine the application, the step of encrypting the application and sending the application to an antivirus software company.

7. The method of claim 1 further comprising, in response to the declaring step, the step of transmitting an alert to each computer in an enterprise associated with the client computer.

8. The method of claim 1 wherein the comparing step comprises the substeps of:
- decomposing the e-mail into constituent parts; and
- determining that the application is attempting to send itself when a replica of the application is detected in one of the constituent parts.

9. The method of claim 1 when near identicalness is defined to mean that no more than one byte out of a preselected threshold number of bytes varies between the file and the application.

10. The method of claim 9 wherein the preselected threshold number is 512.

11. Apparatus for detecting by a proxy computer interposed between a client computer and an e-mail server the presence of malicious computer code in an e-mail sent from the client computer to the e-mail server, said apparatus comprising:
- the proxy computer interposed between the client computer and the e-mail server, said proxy computer comprising:
  - a redirector module adapted to intercept e-mails sent from the client computer to the e-mail server, wherein the redirector module intercepts an e-mail sent with a file by an application on the client computer; and
  - coupled to the redirector module, a scan manager module adapted to: compare the file that was intercepted by and now resides within the proxy with the application that sent the e-mail and that resides on the client computer to determine whether the application is attempting to send itself as part of the e-mail;
  - declare a suspicion of malicious code in the file and in the application when the file is determined to be a nearly identical copy of the application;
  - determine whether a digital signature has been affixed to the file;
  - verify the digital signature with a trusted source upon determining that a digital signature has been affixed to the file; and
  - rescind the declaration of a suspicion of malicious code responsive to the determination and positive verification.

12. The apparatus of claim 11 further comprising, coupled to the scan manager module, a decomposer module adapted to:
- decompose e-mail into constituent parts; and
- determine that the application is attempting to send itself as part of an e-mail when a near replica of the application is detected in one of the constituent parts.

13. A computer-readable medium containing computer program instructions for detecting by a proxy interposed between a client computer and an e-mail server the presence of malicious computer code in an e-mail sent from the client computer to the e-mail server computer, said computer program instructions performing the steps of:
- intercepting by the proxy that is interposed between the client computer and the e-mail server e-mails sent from the client computer to the e-mail server, wherein the proxy intercepts an e-mail sent with a file by an application on the client computer;
- comparing the file that was intercepted by and now resides within the proxy with the application that sent the e-mail and that resides on the client computer to determine whether the application is attempting to send itself as part of the e-mail;
- declaring a suspicion of malicious code in the file and in the application when the file is determined to be a nearly identical copy of the application mail;
- determining whether a digital signature has been affixed to the file;
- verifying the digital signature with a trusted source upon determining that a digital signature has been affixed to the file; and
- rescinding the declaration of a suspicion of malicious code responsive to the determination and positive verification.

14. The computer-readable medium of claim 13 further comprising computer program instructions for, in response to the declaring step, sending a message to a user of the client computer giving said user a plurality of choices, comprising at least one choice from the following group of choices:
- preventing the application from e-mailing itself;
- quarantining the application;

allowing the application to send e-mail attachments; and always allowing the application to send e-mail attachments.

15. The computer-readable medium of claim 14 further comprising computer program instructions for, when the user chooses to quarantine the application, encrypting the application and sending the application to an antivirus software company.

16. The computer-readable medium of claim 13 further comprising computer program instructions for, in response to the declaring step, transmitting an alert to each computer in an enterprise associated with the client computer.

17. The computer-readable medium of claim 13 wherein the application is attempting to send itself as part of an e-mail body.

18. The computer-readable medium of claim 13 wherein the application is attempting to send itself as part of an e-mail attachment.

* * * * *

UNITED STATES PATENT AND TRADEMARK OFFICE
CERTIFICATE OF CORRECTION

| | |
|---|---|
| PATENT NO. | : 7,380,277 B2 |
| APPLICATION NO. | : 10/255658 |
| DATED | : May 27, 2008 |
| INVENTOR(S) | : Peter Szor |

Page 1 of 1

It is certified that error appears in the above-identified patent and that said Letters Patent is hereby corrected as shown below:

Claim 13,

Column 6,

Line 51, please delete "mail".

Signed and Sealed this

Second Day of September, 2008

JON W. DUDAS
*Director of the United States Patent and Trademark Office*